United States Patent
Tseng et al.

(10) Patent No.: US 9,411,649 B2
(45) Date of Patent: Aug. 9, 2016

(54) RESOURCE ALLOCATION METHOD

(71) Applicants: National Taiwan University, Taipei (TW); Academia Sinica, Taipei (TW)

(72) Inventors: Po-Hsien Tseng, Taipei (TW); Pi-Cheng Hsiu, Taipei (TW); Chin-Chiang Pan, Taipei (TW); Tei-Wei Kuo, Taipei (TW); Wei-Ming Chen, New Taipei (TW)

(73) Assignees: National Taiwan University, Taipei (TW); Academia Sinica, Taipei (TW)

( * ) Notice: Subject to any disclaimer, the term of this patent is extended or adjusted under 35 U.S.C. 154(b) by 66 days.

(21) Appl. No.: 14/320,661

(22) Filed: Jul. 1, 2014

(65) Prior Publication Data
US 2015/0301864 A1    Oct. 22, 2015

(30) Foreign Application Priority Data
Apr. 17, 2014 (TW) .............................. 103114053 A

(51) Int. Cl.
G06F 9/46 (2006.01)
G06F 9/50 (2006.01)
G06F 9/48 (2006.01)

(52) U.S. Cl.
CPC ............ *G06F 9/5011* (2013.01); *G06F 9/4881* (2013.01); *G06F 9/50* (2013.01)

(58) Field of Classification Search
CPC ........................................................ G06F 9/50
USPC ........................................................ 718/104
See application file for complete search history.

(56) References Cited

U.S. PATENT DOCUMENTS

| 7,913,071 | B2 | 3/2011 | Mallik et al. | |
|---|---|---|---|---|
| 8,250,395 | B2 | 8/2012 | Carter et al. | |
| 2011/0252429 | A1* | 10/2011 | Ballard | G06F 9/485 718/103 |
| 2012/0102497 | A1* | 4/2012 | Stahl | G06F 9/50 718/103 |
| 2012/0210326 | A1 | 8/2012 | Torr et al. | |
| 2012/0254442 | A1* | 10/2012 | Uemura | G06F 9/5011 709/226 |

FOREIGN PATENT DOCUMENTS

| TW | 200913607 | 3/2009 |
|---|---|---|
| TW | 201209581 | 3/2012 |
| TW | 201310220 | 3/2013 |
| TW | 201329686 | 7/2013 |

OTHER PUBLICATIONS

Li Xiao et al., "Dynamic Cluster Resource Allocations for Jobs with Known and Unknown Memory Demands", Mar. 2002, IEEE.*
Anton Beloglazov et al., "Energy Efficient Resource Management in Virtualized Cloud Data Centers", 2010, IEEE.*
"Office Action of Taiwan Counterpart Application," issued on Jun. 18, 2015, p. 1-p. 7.

* cited by examiner

*Primary Examiner* — Wei Zhen
*Assistant Examiner* — Lanny Ung
(74) *Attorney, Agent, or Firm* — Jianq Chyun IP Office

(57) ABSTRACT

A resource allocation method adapted to a mobile device having a multi-core central processing unit (CPU) is provided. The CPU executes at least one application. The method includes steps as follows. A usage status of each of the at least one application is obtained according to a level of concern of a user for each of the at least one application. A sensitivity of at least one thread of each of the at least one application is determined according to the usage status of each of the at least one application. Resources of the CPU are allocated according to the sensitivity of the at least one thread run by the cores.

12 Claims, 8 Drawing Sheets

RESOURCE ALLOCATION METHOD

CROSS-REFERENCE TO RELATED APPLICATION

This application claims the priority benefit of Taiwan application serial no. 103114053, filed on Apr. 17, 2014. The entirety of the above-mentioned patent application is hereby incorporated by reference herein and made a part of this specification.

FIELD OF THE INVENTION

The invention relates to a system scheduling technique; more particularly, the invention relates to a resource allocation method adapted to a multi-core mobile device based on sensitivity.

DESCRIPTION OF RELATED ART

The tremendous changes to the requirements for mobile computing in recent years have led to an explosive growth of the number of mobile applications on "GOOGLE Play". To sustain complicated mobile applications, more and more manufacturers endeavor to improve the hardware performance of mobile devices. For instance, some modern smart phones are equipped with 1.4 GHz quad-core central processing unit (CPU), and the emerging of mobile devices with more cores and/or higher frequencies can be anticipated. Nevertheless, the improved hardware performance often results in significant power consumption, and thus the power management of the next-generation mobile devices will be more crucial than ever.

According to the related art, a dynamic voltage and frequency scaling (DVFS) technique has been proposed to perform analyses by means of a single-core CPU scheduling model, and the operational speed of the CPU is dynamically adjusted to reduce power consumption. After that, other theoretical results have been applied to real-time task scheduling algorithms while different systems with different power models are given. The presence of the multi-core CPU not only brings about the more complicated DVFS but also leads to the researches on dynamic power management (DPM), so as to reduce power consumption of the cores of the CPU. Interactions between DVFS and DPM have also been studied, and DVFS and DPM have been combined to reach the maximum energy efficiency.

Recent mobile applications have become more and more popular and diverse, and users often install various applications for different purposes, thus resulting in a challenge to design DVFS and DPM. Unfortunately, according to the existing solutions, the fair scheduler and the governor on the conventional operating system (e.g., a LINUX operating system) are directly applied to a mobile operating system. Thereby, system performance cannot be enhanced; what is worse, the users' experiences are degraded, and energy efficiency is lessened. For instance, if an application causes an abrupt increase in the CPU word load, the governor scales up the CPU operating frequency or turns on more computing cores to satisfy the needs of such an application, which leads to a reduction of the energy efficiency. By contrast, if the governor cannot react to the unexpected workload in time or even reduces the available CPU resources to save power, the response time of the application to which the user's attention is drawn may be shortened because each application fairly shares all computing resources. Thereby, the users' experiences may be degraded. In view of the above, the scheduling and governing conditions of mobile devices are different from those of the conventional personal computers or servers and thus require specific design to properly manage the energy consumption of the mobile devices without compromising the users' experiences.

SUMMARY OF THE INVENTION

The invention is directed to a resource allocation method for improving users' experiences, wherein the concept of sensitivity of an application is introduced to design the scheduler and the governor, so as to ensure favorable users' experiences without reducing energy efficiency; what is more, the users' experiences may be improved, and the power use efficiency may be further ameliorated.

In an embodiment of the invention, a resource allocation method adapted to a mobile device having a multi-core central processing unit (CPU) is provided. The CPU executes at least one application. The resource allocation method includes steps as follows. A usage status of each of the at least one application is obtained according to a level of concern of a user for each of the at least one application. A sensitivity of at least one thread of each of the at least one application is determined according to the usage status of each of the at least one application. Resources of the CPU are allocated according to the sensitivity of the at least one thread run by the cores.

In light of the foregoing, according to the user-centric resource allocation method provided in an embodiment of the invention, users' behaviors are taken into account to design the user-centric scheduler and governor (UCSG) based on the concept of sensitivity, so as to allocate the resources of the CPU to each application according to the sensitivity. Here, the scheduler prioritizes, allocates, and migrates the threads according to the sensitivity. Besides, the governor performs DPM of the resources of CPU and modulates the dynamic voltage and frequency based on the sensitivity. Thereby, the resource allocation method described herein is conducive to both the improvement of the users' experiences based on the users' behaviors and the increase in the power use efficiency.

Several exemplary embodiments accompanied with figures are described in detail below to further describe the invention in details.

DETAILED DESCRIPTION OF DISCLOSED EMBODIMENTS

To satisfy users' needs for mobile devices, modern mobile applications provide a large variety of functionalities, some of which are delay-sensitive, while others are delay-tolerant. Specifically, "delay-tolerant applications" (e.g., file zipping applications) can be delayed without affecting the users' experiences, i.e., the delay-tolerant applications need not respond in a real-time manner. By contrast, "delay-sensitive applications", such as video playing applications, are extremely sensitive to delays from the users' points of view and thus require timely responses. In other words, different applications may have different sensitivities in terms of user perception, and accordingly the resources of the CPU should be allocated unfairly according to the sensitivity of each application. The applications with high sensitivity should obtain more resources from the CPU to improve the users' experiences, and the applications with low sensitivity should obtain less resources from the CPU to reduce power consumption. In view of the aforementioned, a resource allocation method is provided herein. In order to make the invention more comprehensible, embodiments are described below as examples to demonstrate that the invention can actually be realized.

Figure 1A:
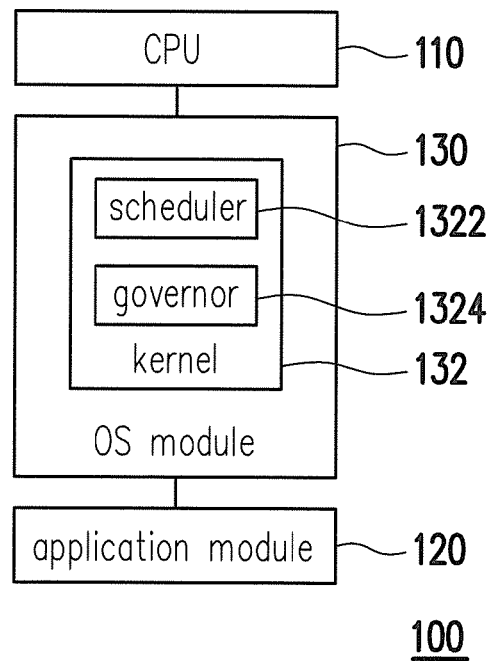
FIG. 1A is a block diagram illustrating a mobile device according to an embodiment of the invention.

FIG. 1A is a block diagram illustrating a mobile device according to an embodiment of the invention. With reference to FIG. 1A, the mobile device 100 includes and is not limited to a notebook computer, a personal digital assistant (PDA), a smart phone, or any other mobile electronic device capable of performing the computing function, for instance. Here, the mobile device 100 includes a CPU 110, an application module 120, and an operating system module 130, functions of which are respectively described below.

The CPU 110 serves to control the overall operation of the mobile device 100. Here, the CPU 110 may include multi-core processors, e.g., a dual-core processor, a triple-core processor, a quad-core processor, and so on, while the number of cores is not limited in the present embodiment. The basic unit of the CPU 110 is a thread of execution; based on the diversity of the tasks, the mobile device 100 may implement plural threads to execute different tasks at one time according to a time-sharing technique of the CPU 110.

The application module 120 serves to provide one or more applications that may be download through internet and installed into the mobile device 100. The interactions (e.g., use or operation) between the user and the applications decide the level of concern of the user for each of the at least one application; that is, each application may have its own usage status. Each of the applications may be categorized to have different levels of sensitivities according to the usage status of each of the applications. For instance, the applications may be executed on the foreground or on the background according to the level of concern of the user for each of the applications, which should however not be construed as a limitation to the invention. Hence, when one application is executed on the foreground, or when the user executes the application via a touch action, the application draws high level of concern of the user and thus has high sensitivity; when one application is executed on the background, the application draws low level of concern of the user and thus has low sensitivity. In another aspect, if the user stops executing an application halfway, such application may be categorized to have low sensitivity as well. Note that one or more threads belonging to the same application may have the sensitivity corresponding to the same application. For instance, one or more threads belonging to the application with high sensitivity may have high sensitivity as well.

For illustrative purposes, the sensitivities of applications described in the present embodiment may be classified into three levels: high, medium, and low. It should however be mentioned that other sensitivity levels are applicable according to other embodiments of the invention.

Figure 1B:
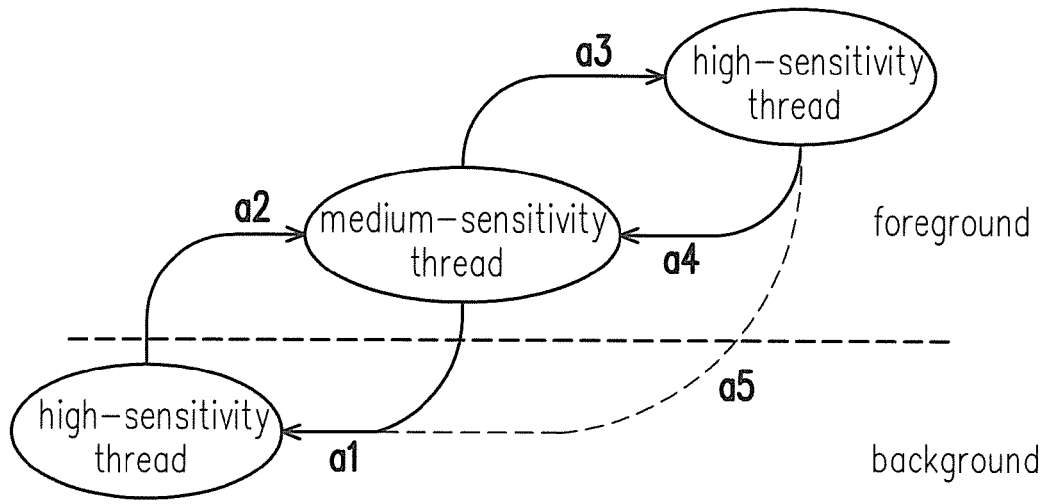
FIG. 1B is a schematic diagram illustrating thread migration by exploiting sensitivity according to an embodiment of the invention.

To be specific, one or more threads belonging to the same application may inherit the sensitivity from each other or one another. For instance, given that an initial thread of an application program has the sensitivity set as medium, the subsequent thread may inherit the sensitivity from the initial thread, i.e., the medium sensitivity. From another perspective, the sensitivity of one or more threads belonging to the same application may be different from each other or one another due to thread migration. FIG. 1B is a schematic diagram illustrating thread migration by exploiting sensitivity according to an embodiment of the invention. Here, the threads belonging to the foreground application are classified as high or medium-sensitivity threads, while the threads belonging to the background application are classified as low-sensitivity threads. With reference to FIG. 1B, when the medium-sensitivity application is switched from the foreground to be executed on the background, the application becomes the low-sensitivity application, and all threads belonging to the low-sensitivity application are also switched to have the low sensitivity (as shown by a direction a1). Alternatively, when the low-sensitivity application is switched from the background to be executed on the foreground, the application becomes the medium-sensitivity application, and all threads belonging to the medium-sensitivity application are also switched to have the medium sensitivity (as shown by a direction a2). Besides, to a foreground application, when the user interacts with the mobile device 100 (e.g., if an operating command activated by the user touching the screen of the mobile device 100 is received, or if a physical button or a virtual button of the mobile device 100 corresponding to an operating command is touched), all threads belonging to the foreground application and having the medium sensitivity may transit to the high-sensitivity state (e.g., as shown by a direction a3); by contrast, if the interaction between the user and the mobile device 100 is terminated (e.g., if the user stops touching the physical button or the virtual button of the mobile device 100 or on the screen of the mobile device 100), all the threads of the foreground application may transit from the high to the medium-sensitivity state (as shown by a direction a4). That is, after the touch action is performed by the user, the threads of the foreground application may stay in the high-sensitivity state during a predetermined period and may be switched to be in the medium-sensitivity state after the predetermined period. If the screen of the mobile device 100 is turned off, all the applications are switched to be executed on the background, and thus all the threads belonging to the applications may transit to the low-sensitivity state directly from the high-sensitivity state (e.g., as shown by a direction a5); after the screen of the mobile device 100 is turned on, the threads belonging to the applications may return to the previous sensitivity state before the screen is turned off.

With reference to FIG. 1A, the operating system module 130 is a system program managing the resources of system hardware and software of the mobile device 100 and is, for instance, an ANDROID operating system or a LINUX operating system; however, the invention is not limited thereto. In particular, the main tasks of the operating system 130 may include: effectively allocating the resources of the CPU 110 to various processes, allocating memories (not shown) to each process, allowing users to safely access and control files, managing a variety of peripheral systems, arranging resources according to a process control list, and so on. In the present embodiment, the operating system module 130 obtains a usage status of each application according to the level of concern of the user for each application. Here, the level of concern of the user for each application is, for instance, touch events initiated by the user or operating commands issued by the user to each application or to the mobile device 100. According to the usage status of each application, the operating system module 130 determines the sensitivity of the thread of each application; that is, each sensitivity corresponds to one usage status. If the usage status of one of the applications is changed, the operating system module 130 correspondingly adjusts the sensitivity of the thread of the one of the applications. For instance, if the usage status of one of the applications is changed from a heavy usage status indicating "the high level of concern of the user" to a light usage status indicating "the low level of concern of the user", the operating system module 130 reduces the sensitivity of the thread of the one of the applications; if the usage status of the one of the applications is changed from the light usage status indicating "the low level of concern of the user" to the heavy usage status "the high level of concern of the user", the operating system module 130 also reduces the sensitivity of the thread of the one of the applications. Thereby, the operating system module 130 may allocate the resources of the CPU according to the sensitivities of the threads run by the cores.

To be specific, the operating system module 130 includes a kernel 132 that further includes a scheduler 1322 and a governor 1324. The scheduler 1322 serves to supervise thread execution through a selection mechanism, for instance, so as to determine the next thread to be executed and the next core to be used. For instance, if the core independent voltage and clock adjusting technique of the CPU 110 is employed, the scheduler 1322 outputs different scheduling plans according to the status and the nature of each running thread. The governor 1324 serves to determine the manner in which the CPU works, e.g., the governor 1324 decides to scale up or scale down the frequency according to the workload or decides to turn on or off the cores.

Besides, the application module 120 and the operating system module 130 may be individual chips or programming codes written in a certain programming language. For instance, the application module 120 and the operating system module 130 may be programming codes that are written by a programming language and stored in a storage unit (not shown), so as to be executed by the CPU 110. Here, the storage unit is a non-volatile memory, a flash memory, a hard disk, and so on, for instance.

Figure 2A:
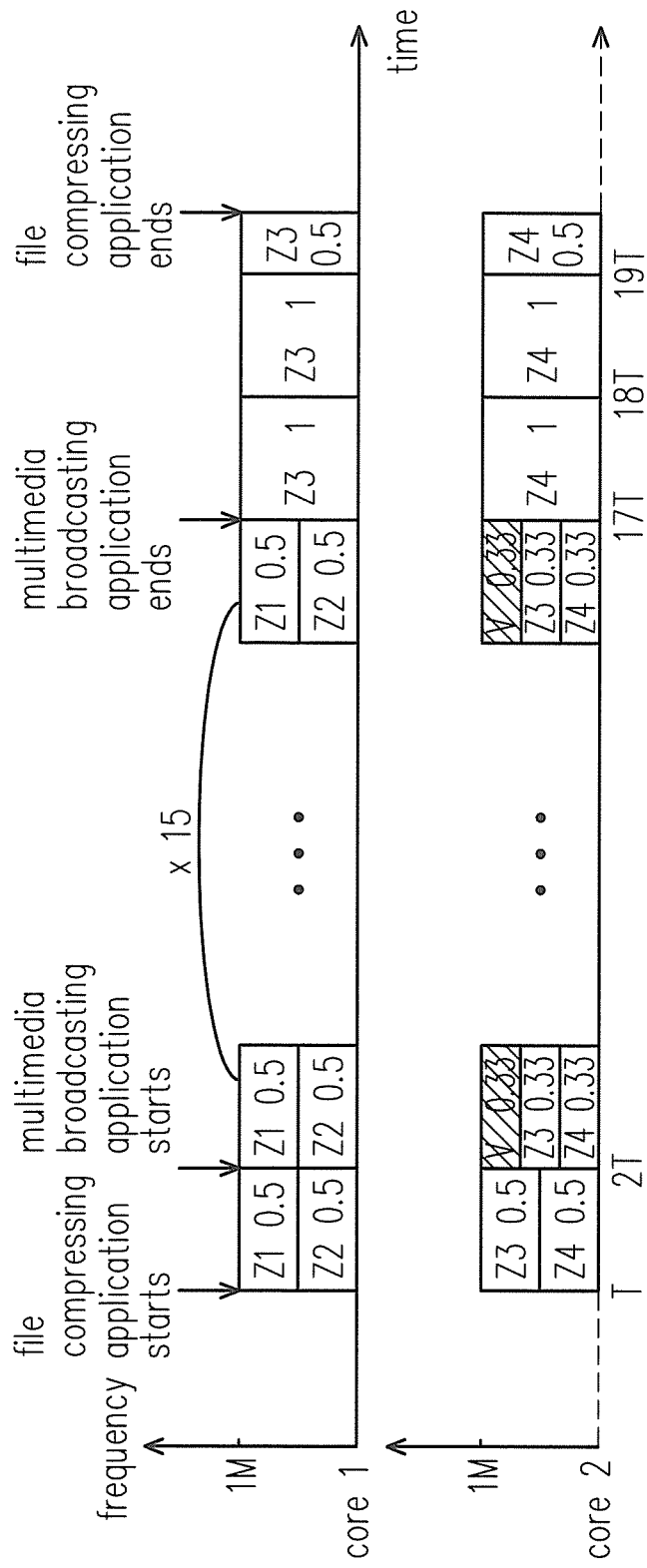
FIG. 2A is a schematic diagram illustrating performance resulting from a conventional scheduler and a conventional governor.
Figure 2B:
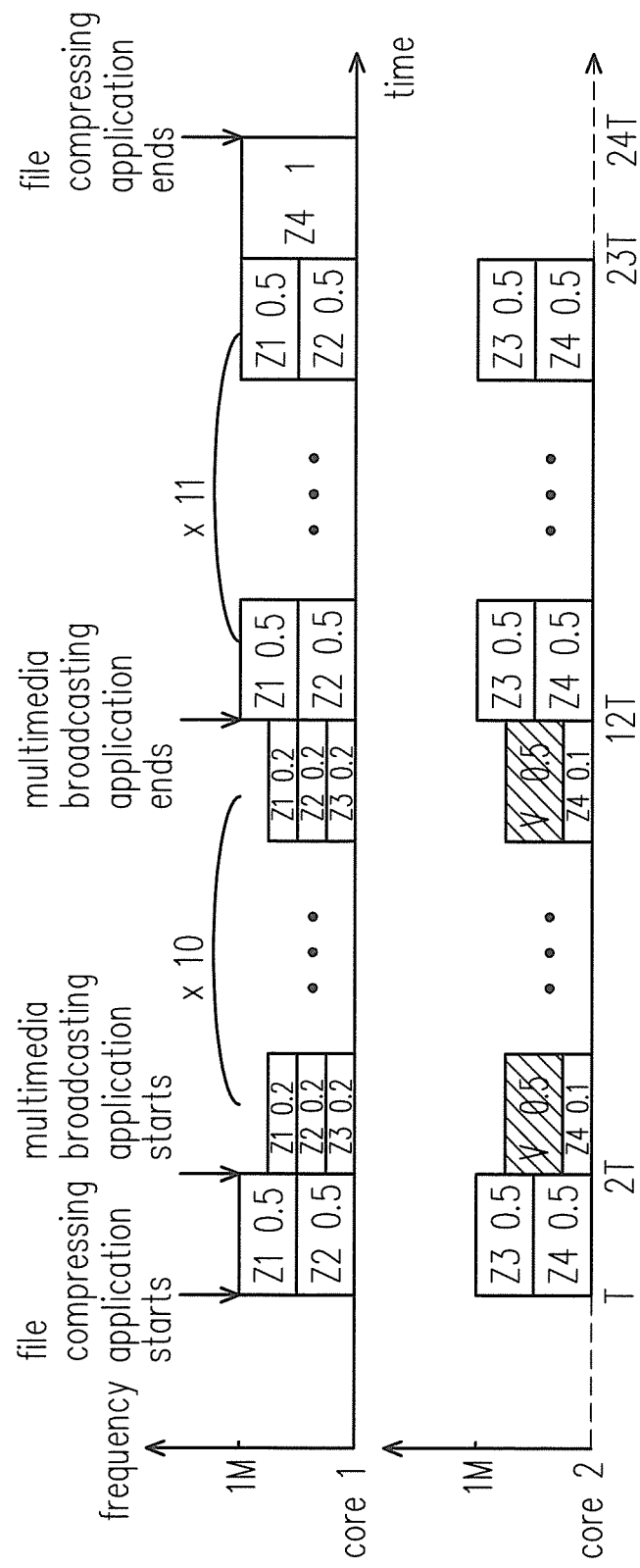
FIG. 2B is a schematic diagram illustrating performance resulting from a scheduler and a governor provided in an embodiment of the invention.

Differences in the performance between the conventional scheduler and the conventional governor and the user-centric scheduler 1324 and the user-centric governor 1324 provided in the present embodiment are explained hereinafter. FIG. 2A is a schematic diagram illustrating performance resulting from a conventional scheduler and a conventional governor. FIG. 2B is a schematic diagram illustrating performance resulting from a scheduler and a governor provided in an embodiment of the invention. According to the scenario discussed herein, a file compressing application and a multimedia broadcasting application are simultaneously run on a dual-core CPU 110, for instance. With reference to FIG. 2A, according to the related art, the core 2 is initially in an off mode to save power, as shown by dashed lines on the time axis. When the file compressing application is executed at the time T, both cores 1 and 2 are turned on to execute four threads Z1 to Z4 generated by the file compressing application. The threads Z1 to Z4 are equally allocated to the cores 1 and 2 by the scheduler, and each of the threads Z1 to Z4 is allocated with 0.5 mega computing cycle. The multimedia broadcasting application starts running at the time 2T. Since each of the cores 1 and 2 is respectively occupied by two threads Z1-Z2 and two threads Z3-Z4, the thread V generated by the multimedia broadcasting application is randomly allocated to the core 2. The thread V has to share the available computing cycles evenly with the threads Z3 and Z4, and therefore each of the threads V, Z3, and Z4 is allocated with 0.33 computing cycle. Since the cores 1 and 2 already operate at the highest frequency level, the governor is not able to further increase the frequency of the CPU. As a result, until the multimedia broadcasting application ends at the time 17T, the user may experience the stall problem while using the multimedia broadcasting application. After the threads Z1 and Z2 are finished, the scheduler reallocates more computing cycles to the threads Z3 and Z4. The threads Z3 and Z4 are run on the cores 1 and 2 and are finished at the time 19.5T; at this time, the core 2 is turned off to save power, as shown by the dashed lines on the time axis. Apparently, such design does not contribute to satisfactory users' experiences.

However, in the present embodiment, the multimedia broadcasting application is executed on the foreground and thus has the medium sensitivity, and the thread belonging to the multimedia broadcasting application also has the medium sensitivity; by contrast, the file compressing application has the low sensitivity, and the thread belonging to the file compressing application also has the low sensitivity. As described herein, the resources of the CPU are allocated according to the sensitivity of each application. With reference to FIG. 2B, when the file compressing application starts running at the time T, the scheduler 1322 provided in the present embodiment equally allocates the four threads Z1 to Z4 generated by the file compressing application to the cores 1 and 2. The multimedia broadcasting application starts running at the time 2T. To achieve the smooth frame rate, the scheduler 1322 moves the thread Z3 to the core 1 and reallocates the computing cycles according to the five threads, thread V and threads Z1 to Z4. Since the thread V requires 0.5 mega computing cycle, the governor 1324 scales down the frequency of the CPU to 0.5 mega computing cycle to save power. After the multimedia broadcasting application ends at the time 12T, the scheduler 1322 moves the thread Z3 from the core 1 back to the core 2 and reallocates the computing cycles. The file compressing application is finished at the time 24T. Although the file compressing application provided herein ends later than that shown in FIG. 2A, the user does not perceive the delay of the ending of the file compressing application; instead, the user is able to experience the smooth broadcasting achieved by the multimedia broadcasting application. Note that the file compressing application may be switched to be executed on the foreground and may then be finished earlier; alternatively, the file compressing application may be executed on the background to save power. That is, the user-centric scheduler 1322 and the user-centric governor 1324 are designed to improve the users' experiences and save power.

In order to ensure favorable users' experiences without sacrificing the energy efficiency, how the scheduler 1322 and the governor 1324 are designed to be applied to the mobile device 100 according to the concept of sensitivity is explained below.

Design Principles

Consideration of Users' Experiences

To improve the users' experiences, more resources of the CPU should be allocated to the threads with higher sensitivities instead of the thread with lower sensitivities. Hence, the scheduler 1322 described in the present embodiment allocates the CPU time per scheduling period according to whether the threads are in the high-, medium-, or low-sensitivity state. Note that the three levels of sensitivities are merely exemplary and should not be construed as a limitation to the invention. Besides, the scheduler 1322 also tends to distribute the high-sensitivity threads or the medium sensitivity to active cores, so as to balance the total sensitivities of the threads run by all active cores.

Consideration of Energy Efficiency

To reduce power consumption, the resources of the CPU should be allocated according to the sensitivity of the running threads. The governor 1324 thus allocates as many resources as possible to the threads with high sensitivity, allocates adequate resources to the threads with medium sensitivity, and allocates limited resources to the threads with low sensitivity. Besides, imbalanced utilization of cores consumes more power; therefore the scheduler 1322 balances not only the sensitivity of the thread run by each core but also utilization of the cores.

2. Design of Scheduler

Here, how the scheduler 1322 performs thread prioritization, thread allocation, and thread migration according to the sensitivity of each application is explained hereinafter.

Thread Prioritization:

The scheduler 1322 allocates the CPU time per scheduling period to the running threads according to their sensitivities. According to the present embodiment, Samsung Galaxy S3 manufactured by Samsung Electronics in Korea is applied, and its CPU time is 6.6 ms. Besides, in the present embodiment, the ANDROID priority system is applied. In the ANDROID priority system, the threads are prioritized according to a "nice value" in the range from −20 to 19. Here, small nice values imply higher priorities of the threads. Given that the difference between the nice values of two threads is k, the CPU time allocated to the thread with higher priority is approximately $1.25^k$ times the CPU time allocated to the thread with lower priority. The larger the value of k is, the more unequally the CPU time is allocated by the scheduler 1322 to the threads. In the present embodiment, the nice values corresponding to the high sensitivity, the medium sensitivity, and the low sensitivity are −20, −10, and 0, respectively. The nice values demonstrate that the low-sensitivity thread has low priority, while the users' experiences in the application correspondingly having the low sensitivity are not significant affected. In addition, once the sensitivity of the thread is changed, the scheduler 1322 performs the thread prioritization.

Thread Allocation:

The scheduler 1322 allocates each new thread (which already executes a "FORK" command) to an active core according to the sensitivity of the new thread. Here, the new thread executing the "FORK" command inherits the sensitivity of its parent thread. If the sensitivity of the thread is medium or high, the scheduler 1322 allocates the thread to the core with the minimum total sensitivity, such that the thread may obtain more resources of the CPU. On the contrary, if the sensitivity of the thread is low, the scheduler 1322 allocates the thread to the core with the minimum workload, so as to balance the utilization of the cores. According to the present embodiment, the sensitivity values of the high-sensitivity thread, the medium-sensitivity thread, and the low-sensitivity thread may be set as 3, 2, and 1 respectively, and the total sensitivity of the core is the sum of the sensitivity values of the threads run by the cores. Besides, the total workload is the sum of the computing cycles of the threads run by the cores in each sampling period. According to said settings, the scheduler 1322 may allocate the high-sensitivity thread, the medium-sensitivity thread, and the low-sensitivity thread to different cores.

Thread Migration:

Through thread migration, the scheduler 1322 balances the total sensitivity and the usage of the cores. In the present embodiment, the sampling period is set as 200 ms to allow a trade-off between the extra overheads and the reaction time to workload changes. Here, two steps may be performed. In the first step, the threads are moved from the core with the maximum total sensitivity to the core with the minimum total sensitivity until the total sensitivity of the core with the maximum total sensitivity becomes lower than the total sensitivity of the core with the minimum total sensitivity. The sensitivity is balanced to allow the high-sensitivity threads to run on the core with fewer threads, and the core with the minimum total sensitivity often has fewer threads; accordingly, the high-sensitivity threads are moved to other cores. In the second step, the threads are repeatedly moved from the core with the maximum total workload to the core with the minimum total workload until the total workload of the core with the maximum total workload becomes lower than a total workload of the core with the minimum total workload. Here, the threads with low sensitivity are suitable for being moved to other cores in a first-in-first-out (FIFO) order, such that the threads moved in the first step are no longer moved back to the original core.

3. Design of Governor

How the governor 1324 manages the resources of the CPU according to the sensitivity through dynamic power management (DPM) and dynamic voltage and frequency scaling (DVFS) is described hereinafter.

DPM:

Based on the total workload and the CPU power mode, the governor 1324 periodically turns on or off the cores to prevent unnecessary power consumption. Here, the sampling period is set to be 200 ms (as mentioned above), for instance. In a multi-core system, the relationship between the power consumed by the core and the operating frequency appears to be a convex increasing function, and turning off as many cores as possible may not necessarily save power. In the present embodiment, Samsung Galaxy S3 equipped with a quad-core CPU 110 is exemplified to explain the invention. If the total workload is assumed to be evenly distributed to two cores, and if the frequency required for one-core operation exceeds 400 MHz, dual-core operation is deemed more efficient. If the frequency required for dual-core operation exceeds 400 MHz, triple-core operation is deemed more efficient. In each sampling period (e.g., 200 ms), one-core operation, dual-core operation, and triple-core operation respectively at 400 MHz, 400 MHz, and 566 MHz can respectively provide 400*0.2=80 (mega), 400*0.2*2=160(mega), and 566*0.2*3=340(mega)computing cycles. That is, the number of cores to be turned on is determined according to whether the total workload in the sampling period exceeds said three thresholds. However, the total workload generated in said sampling period is highly relevant to the sensitivity of the running threads. Besides, the number of the active cores need be less than or equal to the number of the running threads. If any active core is turned off, the threads run by the core should be moved to other active cores.

DVFS:

After the number of the active cores is determined, the governor 1324 selects an appropriate operating frequency for the sampling period according to the total workload in the sampling period and the sensitivity of the running threads in each core. Specifically, if any of the threads has the high sensitivity, the governor 1324 selects the highest frequency and provides the same to the thread, so as to provide the thread with as many resources of the CPU as possible. The threads remain in the high-sensitivity state for a short period of time (e.g., 500 ms), unnecessary energy consumption may be prevented, and the users' experience can be improved significantly. Otherwise, if there are no high-sensitivity threads, the operating frequency is selected by the governor 1324, which will be described below. For the medium-sensitivity threads in the active core, the needs of these threads for the computing cycles can be satisfied; however, the needs of the low-sensitivity threads for the computing cycles can merely be satisfied in part. In the present embodiment, if the needs of all the medium-sensitivity threads for the resources of CPU are satisfied, the governor 1324 provides the low-sensitivity threads with the least resources of CPU. Specifically, in the sampling period, if the number of computing cycles allocated by the governor 1324 to the medium-sensitivity threads is assumed to be $C_m$, the number $C_l$ of computing cycles allocated by the governor 1324 to the medium-sensitivity threads run by the same core is $C_m*N_l/(N_l+1.25^{k}*N_m)$, where $N_l$ and $N_m$ respectively denote the number of low-sensitivity threads and the number of medium-sensitivity threads run by the core, and k is the difference between the nice values of the low-sensitivity and medium-sensitivity threads, e.g., k=10−(−10)=20. Therefore, if the needs of the medium-sensitivity threads for the resources of CPU are to be satisfied, the core need be operated at the frequency of at least $(C_l+C_m)/0.2$ MHz.

Figure 3:
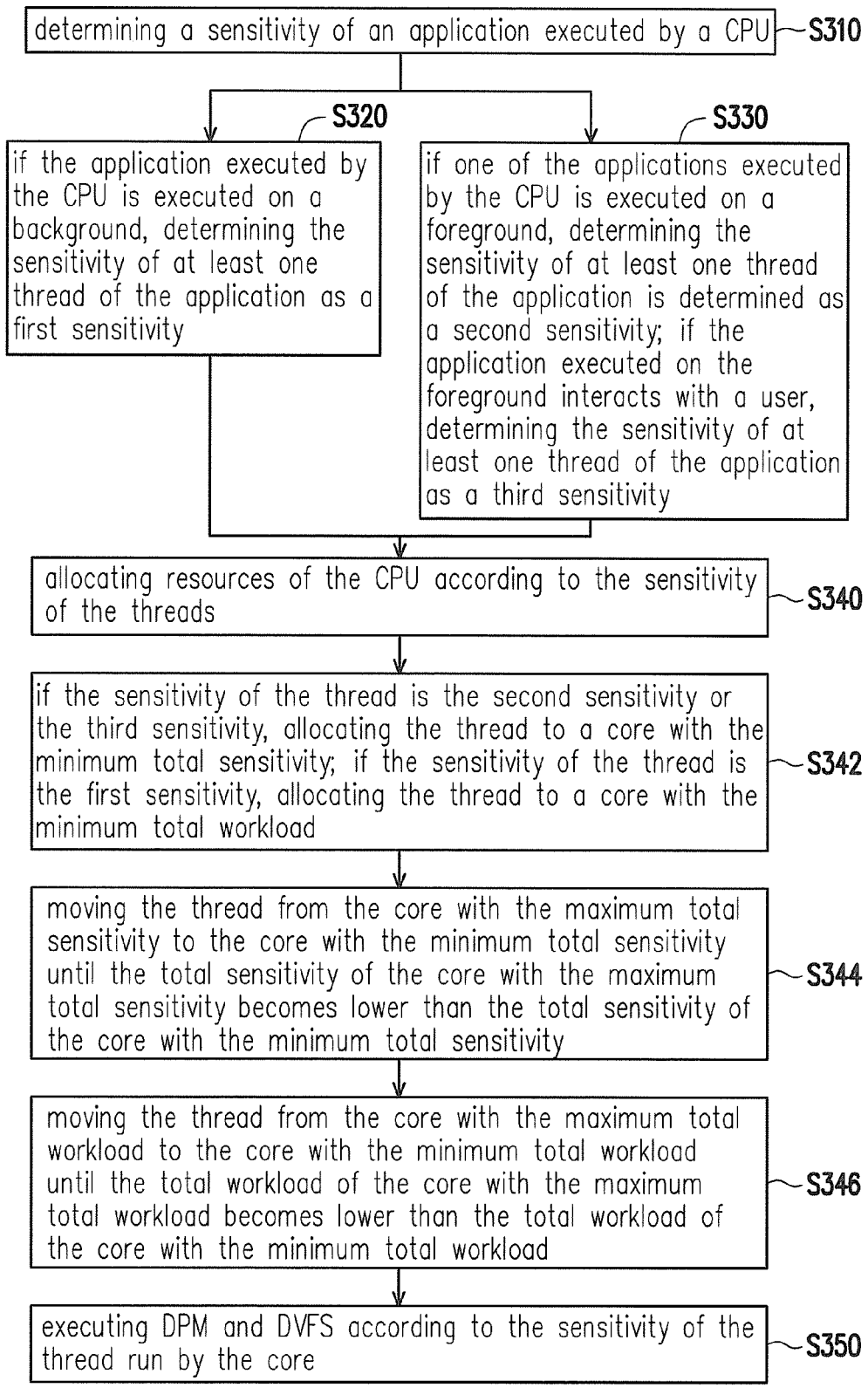
FIG. 3 is a flowchart illustrating a resource allocation method according to an embodiment of the invention.

FIG. 3 is a flowchart illustrating a resource allocation method according to an embodiment of the invention. The resource allocation method provided in the present embodiment is explained with reference to FIG. 3. As shown in FIG. 3, in step S310, the sensitivity of the application executed by the CPU 110 is determined according to whether the application is executed on a background or a foreground and according to whether the application interacts with the user. Specifically, in step S320, if the application executed by the CPU 110 is executed on the background, the sensitivity of at least one thread of the application is determined as a first sensitivity (e.g., low sensitivity). In step S330, if one of the applications executed by the CPU 110 is executed on the foreground, the sensitivity of at least one thread of the one of the applications is determined as a second sensitivity (e.g., medium sensitivity). If the application executed on the foreground interacts with the user, the sensitivity of at least one thread of the application is determined as a third sensitivity (e.g., high sensitivity). In step S340, the resources of the CPU 110 are allocated according to the sensitivity of the threads. Particularly, in step S342, if the sensitivity of the thread is the second sensitivity or the third sensitivity, the thread is allocated to a core with the minimum total sensitivity; if the sensitivity of the thread is the first sensitivity, the thread is allocated to a core with the minimum total workload. In step S344, the thread is moved from the core with the maximum total sensitivity to the core with the minimum total sensitivity until the total sensitivity of the core with the maximum total sensitivity becomes lower than the total sensitivity of the core with the minimum total sensitivity. In step S346, the thread is moved from the core with the maximum total workload to the core with the minimum total workload until the total workload of the core with the maximum total workload becomes lower than the total workload of the core with the minimum total workload. In step S350, DPM and DVFS are executed according to the sensitivity of the thread run by the core. In the present embodiment, the order of performing steps S320-S330 is not limited to the above. Besides, if the condition of executing the application is changed, e.g., if the application is switched to be executed on the background/foreground or stops/starts interacting with the user, the sensitivity of the application and the sensitivity of its thread are also changed; at this time, step S310 is performed again, so as to reallocate the resources of the CPU. Accordingly, the resource allocation method described herein may ensure favorable users' experiences without lessening the energy efficiency and may further lead to both the improvement of the users' experiences and the increase in the power use efficiency.

One more experimental example is provided below to prove and evaluate the efficacy of the invention.

Experiment Setup:

Here, the Samsung Galaxy S3 smart phone equipped with the 1.4 GHz quad-core CPU 110. The four cores are required to be operated synchronously at the same frequency, whereas they may be individually turned on or off. The hardware and software specifications of Samsung Galaxy S3 are detailed in Table 1. Besides, the power consumption inspector produced by Monsoon Solutions is applied herein to measure the transient power and energy consumption of the smart phone.

TABLE 1

| Hardware | |
|---|---|
| Processor | Quad-Core ARM Cortex-A9 200 MHz-1400 MHz (13 levels) |
| Memory | Random Access Memory (RAM): 1 GB |
| Screen | Super AMOLED 720 × 1280 pixels |
| Network | Wi-Fi standard: IEEE 802.11a/b/g/n |
| Storage Unit | SD 2.0 compatible, 8 G |
| Battery Capacity | 2100 mAh |
| Software | |
| OS | Android 4.1.2 LINUX Kernel 3.0.31 |

In the present embodiment, three mobile applications are applied to perform the experiments, i.e., "OI File Manager," "RockPlayer," and "FtpCafe", all of which can perform different functions and can be obtained through "GOOGLE Play". "OI File Manager" serves to provide a user interface that allows a user to manage files and directories on a smart phone. Since "OI File Manager" is an interactive foreground application, it generates the high-sensitivity threads. "RockPlayer" serves to play multimedia files and is a non-interactive application that is not executed on the foreground, and thus it generates the long-running threads with medium sensitivity. "FtpCafe" is a file transfer protocol (FTP) server that enables files to be transferred from one host to another. Since "FtpCafe" is a background application, it generates the low-sensitivity threads.

To clearly explained the above, the applications "OI File Manager," "RockPlayer," and "FtpCafe" are respectively represented by "file manager H," "multimedia player M," and "FTP L". Differences in the performance between the conventional scheduler and governor and the user-centric scheduler and governor (UCSG) provided in the present embodiment are explained hereinafter by means of "file manager H," "multimedia player M," and "FTP L".

Figure 4:
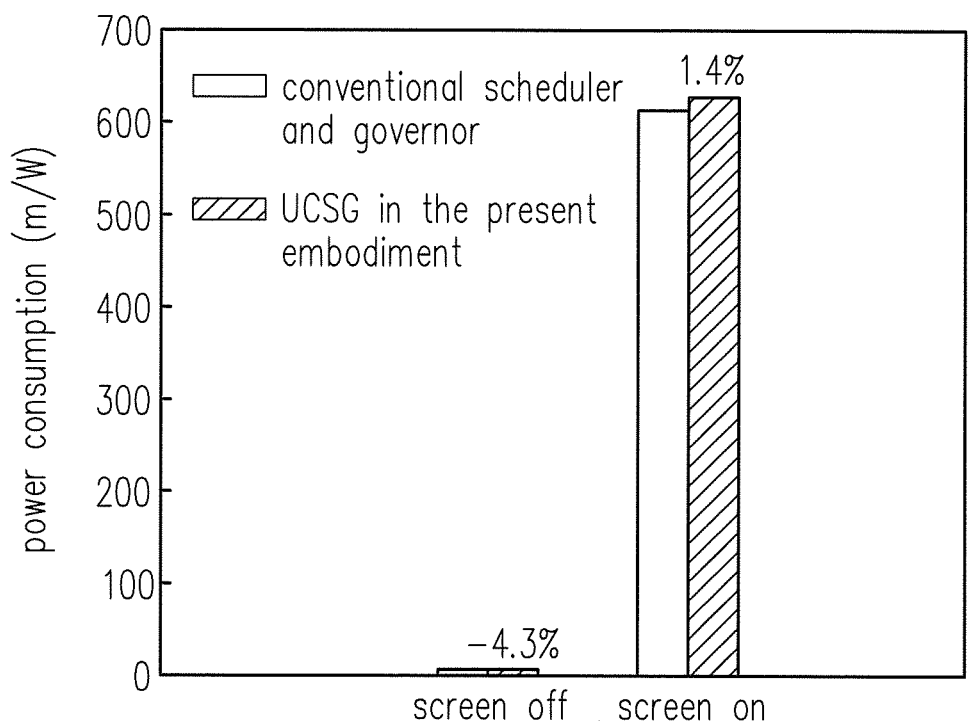
FIG. 4 illustrates a comparison between power consumption of a conventional mobile device in an idling state and power consumption of a mobile device in an idling state according to an embodiment of the invention.

Computational Overheads:

FIG. 4 illustrates a comparison between power consumption of the conventional scheduler and governor in an idling state and power consumption of the UCSG in an idling state according to an embodiment of the invention. With reference to FIG. 4, when the screen is turned off, the CPU enters a low-power dormant mode, and the mobile device barely consumes power at this time; when the screen is turned on, one of the four cores of the CPU is turned on and is operated at the low frequency (200 MHz). It can be observed from FIG. 4 that the power consumption of the UCSG provided in the present embodiment is slightly greater than that of the conventional scheduler and governor. In each sampling period, the UCSG provided in the present embodiments consume more power because the UCSG updates the sensitivity of the threads to predict the computing cycle of each thread. By contrast, the conventional scheduler and governor may roughly consider the number of the running threads and the usage of each core and may thus consume less power. Said difference in power consumption does not last long because the screen of a normal mobile device is automatically turned off to save power while the mobile device is in an idling state.

Figure 5:
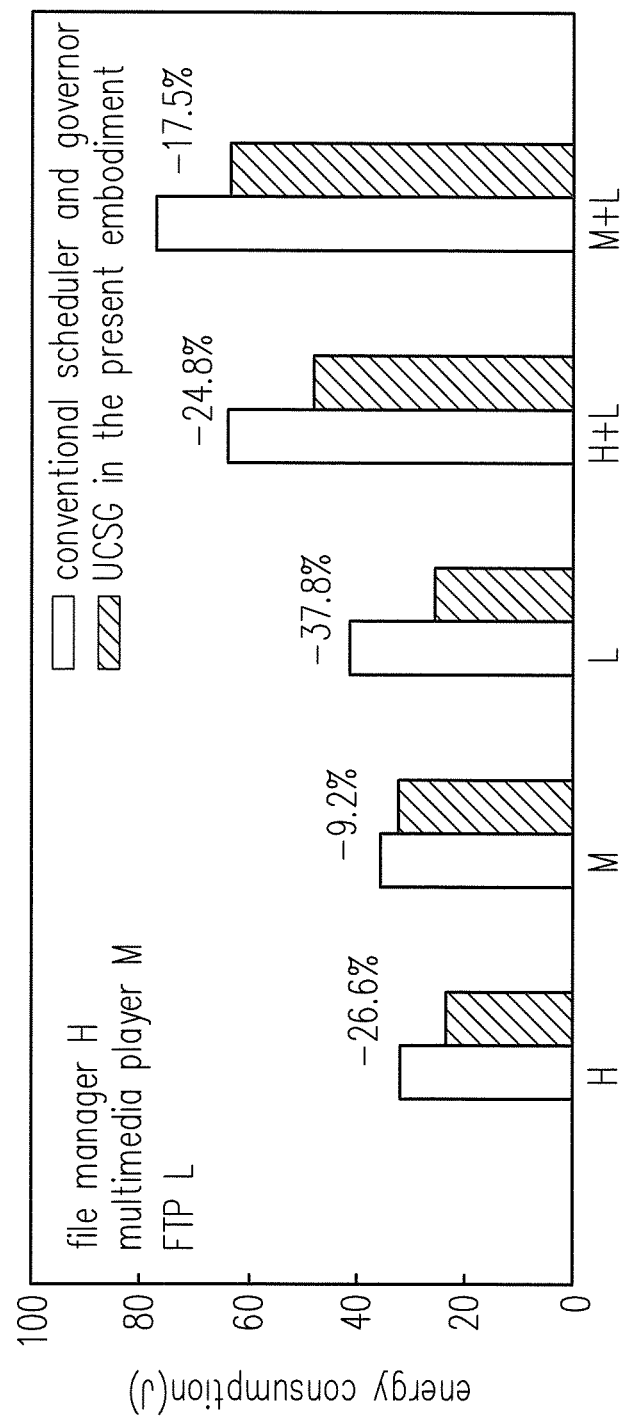
FIG. 5 illustrates a comparison between energy required for executing different applications according to the related art and an embodiment of the invention.

Energy Consumption:

FIG. 5 illustrates a comparison between energy required by the conventional scheduler and governor and energy required by the UCSG provided in the present embodiment for executing different applications. It can be observed from FIG. 5 that the energy required by the conventional scheduler and governor is less than that required by the UCSG provided in the present embodiment because the UCSG allocates limited resources to low-sensitivity threads. Execution of "multimedia player M" is an exception. When only "multimedia player M" is executed, no other background application is executed, and thus the UCSG provided in the present embodiment is unable to allocate limited resources to low-sensitivity threads to save energy; in this case, the energy consumption of the UCSG is substantially the same as that of the conventional scheduler and governor. The efficacy of the UCSG provided in the present embodiment becomes more evident if any other application runs on the background. For instance, if both "file manager H" and "multimedia player M" are executed on the foreground, and "FTP L" is executed on the background, the energy consumption of the UCSG provided in the present embodiment is reduced by 24.8% and 17.5% respectively in comparison with the energy consumption of the conventional scheduler and governor. Compared to the energy consumed by executing "multimedia player M", the energy consumed by executing "file manager H" is reduced to a greater extent. This is because the workload generated by executing "file manager H" does not last long and may be changed from time to time, while the workload resulting from the execution of "multimedia player M" may last long and may remain unchanged.

Figure 6A:
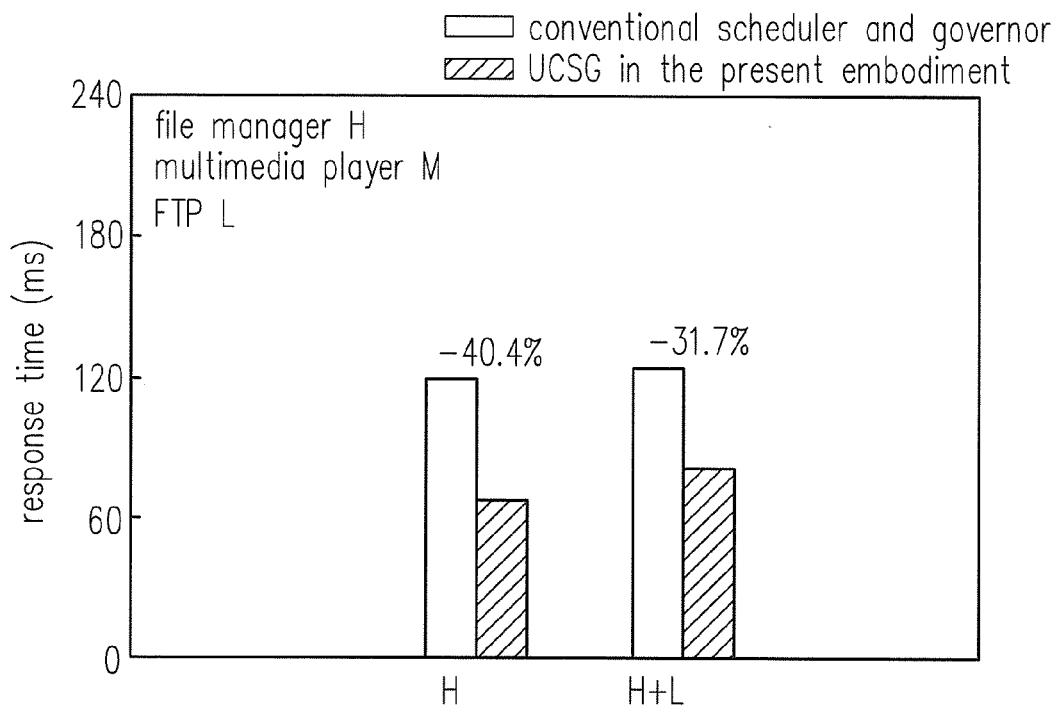
FIG. 6A to FIG. 6C respectively illustrate a comparison of a reaction time, a frame rate, and a completion time according to the related art and an embodiment of the invention.
Figure 6B:
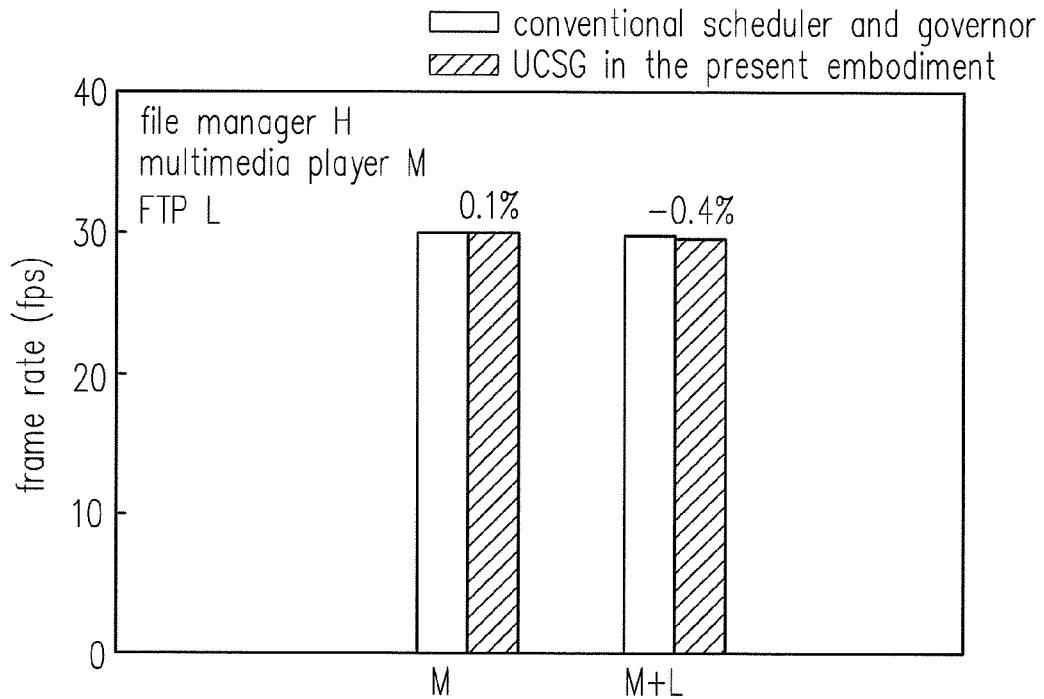
Figure 6C:
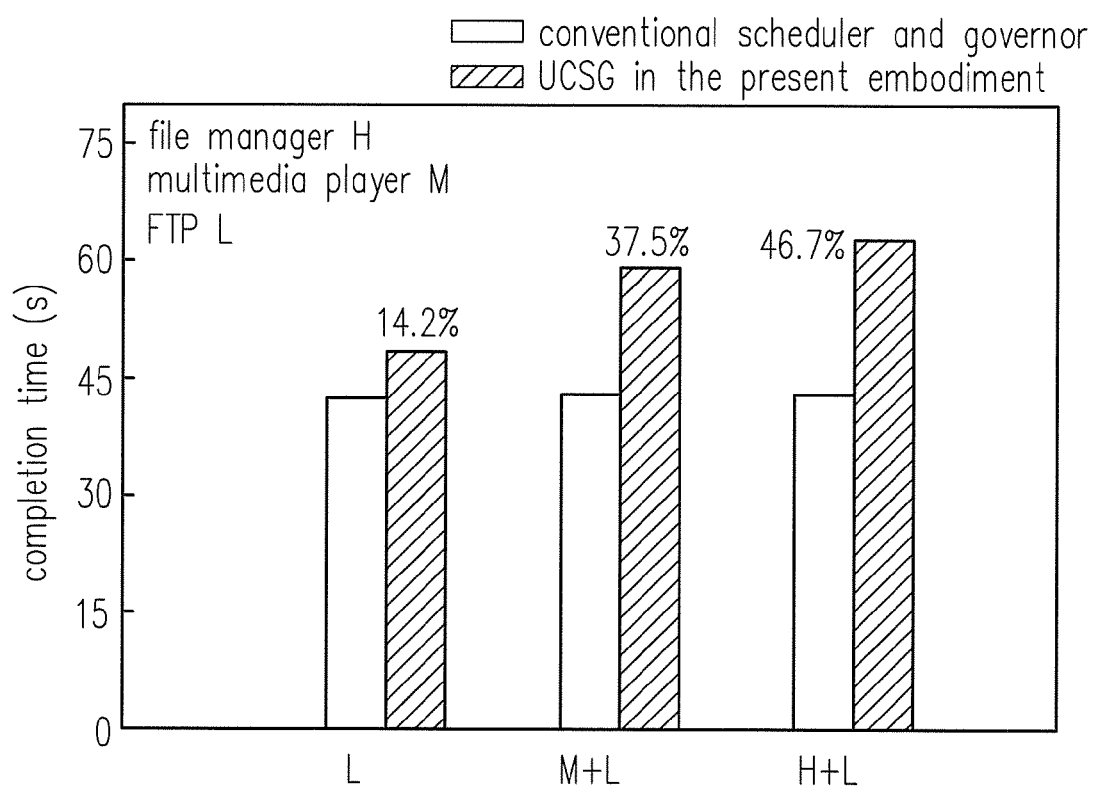

Application Performance:

FIG. 6A to FIG. 6C respectively illustrate a comparison of a reaction time, a frame rate, and a completion time between the conventional scheduler and governor and the UCSG provided in the present embodiment. With reference to FIG. 6A, the UCSG outperforms the conventional scheduler and governor in terms of the response time of "file manager H". The conventional scheduler and governor intends to provide each application with as many resources of CPU as possible, which leads to significant power consumption. In the present embodiment, if one of the threads is changed to be in the high-sensitivity state, the UCSG immediately adjusts the frequency to the maximum level and is thus able to reduce the response time by about 30% in comparison with the conventional scheduler and governor. According to the related art, if the potential workload gradually increases in the sampling period, the conventional scheduler and governor is merely able to scale the frequency up to the maximum level in the next sampling period. With reference to FIG. 6B, the frame rates required for executing the "multimedia player M" are close to the frame rates required for executing the "multimedia player M" and the "FTP L" at the same time; that is, while the "FTP L" is executed, the "multimedia player M" can still smoothly play multimedia files. As shown in FIG. 6C, if the "FTP L" is merely allocated with the limited resources of the CPU to save power, the completion time required by the UCSG provided in the present invention may be incased by 30.8% than the completion time required by the conventional scheduler and governor. The increased completion time may alter together with different parameter settings (e.g., adjusting the nice values in thread prioritization).

To sum up, according to the user-centric resource allocation method provided in an embodiment of the invention, users' behaviors are taken into account to design the UCSG, and the resources of the CPU are allocated to each application according to sensitivity. The scheduler performs thread prioritization, thread allocation, and thread migration according to the sensitivity of each application. Besides, the governor performs DPM of the resources of CPU and modulates the dynamic voltage and frequency based on the sensitivity. In an embodiment of the invention, experiments are performed on various applications on the Samsung Galaxy S3 smart phone. Based on the experimental results, the UCSG provided in an embodiment of the invention is suitable for executing these applications in comparison with the conventional scheduler and governor. Besides, without sacrificing the performance and the users' experiences, less resources of CPU are required by the UCSG than by the conventional scheduler and governor. The rapid increase in the workloads (resulting from the applications with different sensitivities) can be identified in the present embodiment, and whether to allocate more resources of CPU to the applications or not is determined; therefore, compared to the conventional scheduler and governor, the UCSG requires less resources of CPU. This is more evident when the applications executed on the background suddenly generate workloads. As a result, the UCSG described herein and designed on the basis of sensitivity is conducive to both the improvement of the users' experiences based on the users' behaviors and the increase in the power use efficiency.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A resource allocation method adapted to a mobile device having a multi-core central processing unit, the central processing unit executing at least one application, the resource allocation method comprising:
    obtaining a usage status of each of the at least one application according to a level of concern of a user for each of the at least one application;
    determining a sensitivity of at least one thread of each of the at least one application according to the usage status of each of the at least one application, wherein if the at least one application executed by the central processing unit is executed on a background, determining the sensitivity of the at least one thread of each of the at least one application as a first sensitivity, if the at least one application executed by the central processing unit is executed on a foreground, determining the sensitivity of the at least one thread of each of the at least one application as a second sensitivity, and if the at least one application executed on the foreground interacts with the user, determining the sensitivity of the at least one thread of each of the at least one application as a third sensitivity; and allocating resources of the central processing unit according to the sensitivity of the at least one thread run by the cores, if the sensitivity of the at least one thread is the second sensitivity or the third sensitivity, allocating the at least one thread to a core of the cores with a minimum total sensitivity; if the sensitivity of the at least one thread is the first sensitivity, allocating the at least one thread to a core of the cores with a minimum total workload.

2. The resource allocation method as recited in claim 1, further comprising:

if the usage status of one of the at least one application is changed, correspondingly adjusting the sensitivity of the at least one thread of the one of the at least one application, wherein if the usage status of the one of the at least one application is changed from a heavy usage status to a light usage status, the sensitivity of the at least one thread of the one of the at least one application is reduced, and if the usage status of the one of the at least one application is changed from the light usage status to the heavy usage status, the sensitivity of the at least one thread of the one of the at least one application is increased.

3. The resource allocation method as recited in claim 1, further comprising:

if a screen of the mobile device is turned off, classifying the sensitivity of the at least one thread of each of the at least one application as the first sensitivity; and if the screen of the mobile device is turned on, adjusting the sensitivity of the at least one thread of each of the at least one application back to the sensitivity before the screen is turned off.

4. The resource allocation method as recited in claim 1, wherein while the at least one application interacts with the user, the at least one application receives an operating command from the user.

5. The resource allocation method as recited in claim 4, further comprising:

if the at least one application is executed on the foreground, receiving the operating command from the user, such that the sensitivity of the at least one thread of the at least one application executed on the foreground is switched from the second sensitivity to the third sensitivity; and if the at least one application stops receiving the operating command from the user, switching the sensitivity of the at least one thread of the at least one application executed on the foreground from the third sensitivity to the second sensitivity.

6. The resource allocation method as recited in claim 1, wherein the step of allocating the resources of the central processing unit according to the sensitivity of the at least one thread further comprises:

moving the at least one thread from a core of the cores with a maximum total sensitivity to the core with the minimum total sensitivity until a total sensitivity of the core with the maximum total sensitivity becomes lower than a total sensitivity of the core with the minimum total sensitivity;

moving the at least one thread from a core of the cores with a maximum total workload to the core with the minimum total workload until a total workload of the core with the maximum total workload becomes lower than a total workload of the core with the minimum total workload; and executing dynamic power management and dynamic voltage and frequency scaling according to the sensitivity of the at least one thread run by the cores.

7. The resource allocation method as recited in claim 6, wherein the at least one thread with the first, second, and third sensitivities has a sensitivity value, respectively, and the total sensitivity of the cores is a sum of the sensitivity value of each of the at least one thread run by the cores.

8. The resource allocation method as recited in claim 6, wherein the total workload is a sum of a computing cycle of each of the at least one thread run by the cores in each sampling period.

9. The resource allocation method as recited in claim 6, wherein the step of executing the dynamic voltage and frequency scaling according to the sensitivity of the at least one thread run by the cores comprises:

selecting an operating frequency for a sampling period according to the total workload in the sampling period and the sensitivity of the at least one thread run by the cores.

10. The resource allocation method as recited in claim 9, wherein the step of selecting the operating frequency for the sampling period comprises:

if one of the at least one thread has the third sensitivity, selecting a highest frequency and providing the highest frequency to the one of the at least one thread; and if none of the at least one thread has the third sensitivity, and if a requirement for the resources of the central processing unit by all of the at least one thread having the second sensitivity is satisfied, allocating least resources of the resources of the central processing unit to the at least one thread having the first sensitivity.

11. The resource allocation method as recited in claim 1, wherein the step of allocating the resources of the central processing unit according to the sensitivity of the at least one thread comprises:

prioritizing the at least one thread according to a nice value, wherein the smaller the nice value is, the lower the priority of the at least one thread is, and if a difference between the nice value of the at least one thread is k, a processing time allocated to the central processing unit having the at least one thread with high priority is approximately 1.25 k times a processing time allocated to the central processing unit having the at least one thread with low priority.

12. The resource allocation method as recited in claim 1, wherein the mobile device has an ANDROID operating system or a LINUX operating system.

* * * * *